US005777653A

United States Patent [19]

Ide et al.

[11] Patent Number: 5,777,653

[45] Date of Patent: Jul. 7, 1998

[54] THERMAL IMAGE TRANSFER RECORDING METHOD

[75] Inventors: Yoji Ide, Mishima; Tetsuji Kunitake, Numazu; Mihoko Matsumoto, Susono; Yasumitsu Kuga, Numazu, all of Japan

[73] Assignee: Ricoh Company, Ltd., Tokyo, Japan

[21] Appl. No.: 518,979

[22] Filed: Aug. 24, 1995

[30] Foreign Application Priority Data

Aug. 26, 1994 [JP] Japan .................................... 6-225677
Dec. 5, 1994 [JP] Japan .................................... 6-329935

[51] Int. Cl.[6] ................................ B41J 2/315; B41J 2/32; G01D 15/10

[52] U.S. Cl. ............................................................ 347/171

[58] Field of Search .................................. 347/171, 219; 400/234, 618; B41J 15/16

[56] References Cited

U.S. PATENT DOCUMENTS

| | | | |
|---|---|---|---|
| 4,529,993 | 7/1985 | Watanabe et al. | 503/208 |
| 4,614,949 | 9/1986 | Hakkaku et al. | 347/216 |
| 4,627,997 | 12/1986 | Ide | 428/216 |
| 4,777,079 | 10/1988 | Nagamoto et al. | 428/212 |
| 4,983,444 | 1/1991 | Ide et al. | 428/195 |
| 5,053,267 | 10/1991 | Ide et al. | 428/195 |
| 5,087,527 | 2/1992 | Shimura et al. | 428/488 |
| 5,110,389 | 5/1992 | Hiyoshi et al. | 156/234 |
| 5,134,019 | 7/1992 | Shiokawa et al. | 428/212 |
| 5,179,388 | 1/1993 | Shiokawa et al. | 347/171 |
| 5,183,697 | 2/1993 | Ide et al. | 428/195 |
| 5,229,189 | 7/1993 | Hiyoshi et al. | 428/195 |
| 5,238,726 | 8/1993 | Ide et al. | 428/195 |
| 5,250,346 | 10/1993 | Nagai et al. | 428/195 |
| 5,250,361 | 10/1993 | Ide et al. | 428/500 |
| 5,258,234 | 11/1993 | Ide et al. | 428/500 |
| 5,324,585 | 6/1994 | Akiyama et al. | 428/409 |
| 5,328,747 | 7/1994 | Ide et al. | 428/195 |
| 5,336,548 | 8/1994 | Shiokawa et al. | 428/212 |
| 5,362,548 | 11/1994 | Hiyoshi et al. | 428/195 |
| 5,409,758 | 4/1995 | Hiyoshi et al. | 428/138 |
| 5,428,372 | 6/1995 | Akiyama et al. | 347/217 |

FOREIGN PATENT DOCUMENTS 4 215893 11/1992 Germany .

*Primary Examiner*—N. Le
*Assistant Examiner*—L. Anderson
*Attorney, Agent, or Firm*—Oblon, Spivak, McClelland, Maier & Neustadt, P.C.

[57] ABSTRACT

A thermal image transfer recording method includes the steps of holding a thermal image transfer recording medium including a support material and a thermal image transfer layer provided on the support material, and an image recording material between a line edge thermal head and a platen roller, with a contact pressure being applied therebetween; transferring the thermal image transfer recording layer imagewise from the thermal image transfer recording medium to the image recording material with imagewise application of heat by use of the line edge thermal head; and taking up the thermal image transfer recording medium after the image transfer, with the take-up tension applied to the thermal image transfer recording medium being set larger than both the shearing strength and peeling strength at 70° C. of the thermal image transfer layer. A thermal image transfer recording medium including a thermal image transfer layer with a shearing strength of 200 g/cm or more at 25° C. provided on a support material is provided for use in this thermal image transfer recording method.

4 Claims, 3 Drawing Sheets

$$T(g/cm) = \frac{P(g.cm)}{I(cm) \times W(cm)}$$

THERMAL IMAGE TRANSFER RECORDING METHOD

BACKGROUND OF THE INVENTION

1. Field of the Invention

The present invention relates to a thermal image transfer recording method and a thermal image transfer recording medium that can be employed in the thermal image transfer recording method.

2. Discussion of Background

With reference to FIG. 2, when thermal transfer recording is performed by a printer provided with a conventional line plane thermal head 40, a thermal image transfer recording medium 30 and an image recording material 8 are tightly hold between the thermal head 40 and a platen roller 50 and brought into pressure plane contact with each other as illustrated in FIG. 2.

In this thermal image transfer recording method, the thermal image transfer recording medium 30 comes into contact with the image recording material 8 and is then transported in close contact with the image recording material 8 in the direction of the arrow an illustrated in FIG. 2, and images are transferred to and recorded on the image recording material 8 by a heating element portion 401 of the thermal head 40, and the thermal image transfer recording medium 30 in then separated from the image recording material 8. In this process, a distance A between the point where image recording is started on the image recording material 6 by the heating element portion 401 and the point where the thermal image transfer recording medium 30 is separated from the image recording material 8 is generally as large an 3 to 15 mm. This distance is hereinafter referred to as the printing space distance A.

In this printing process, an ink in a thermal image transfer layer of the thermal image transfer recording medium 30 in melted by the thermal head 40 and then cooled in an insufficiently melted state before it is transferred to the image recording material 8, so that clear-cut transferred images are generally difficult to obtain on the image recording material 8.

More specifically, the temperature of the inside of the ink which is once melted is decreased during the transportation of the thermal image transfer recording medium 30 in the above-mentioned printing space distance A, so that occasionally the temperature of the ink almost reaches the ambient temperature thereof. Once the temperature of the ink decreases to such an extent, the ink usually aggregates because of its high inner cohesive force, so that it is extremely difficult to obtain images with high quality and high resolution by the transfer of the ink because of the formation of the so-called void images.

In order to solve this problem, thermal image transfer recording is recently performed by use of a printer provided with a line edge thermal head 20 as illustrated in FIG. 1.

In comparison with the line plane thermal head 40, the printing space distance A of the line edge thermal head 20 in as short as about 80 to 300 μm, preferably about 150 to 250 μm, so that the ink in transferred in a melted or softened state at high temperature and therefore the formation of void images can be avoided.

Furthermore, in the above-mentioned thermal image transfer recording, the difference in temperature between the image areas at high temperature and the non-image areas at low temperature is so large that sharp images with high resolution can be easily obtained.

However, there has been found a new problem in the line edge thermal head that improper transfer of a melted ink also takes place.

According to the analysis of this problem by the inventors of the present invention, this problem is considered to be caused as follows:

In this image recording process, in particular, when a rolled thermal image transfer recording medium is used, immediately after the ink is melted by the line edge thermal head, the recording medium in pulled in the take-up direction of the roll. Currently employed line edge thermal heads have a length in a range of about 5 to 26 cm, which is measured in the direction of the width of the rolled thermal image transfer recording medium, and this length may be increased in the future.

A currently employed thermal image transfer recording medium has almost the same width as the length of such a line edge thermal head.

Since the line edge thermal head in in line contact with the thermal image transfer recording medium, when the thermal image transfer recording medium is pulled in the transporting direction thereof, the tension applied to the thermal image transfer recording medium varies from point to point in the direction of the width thereof. The longer the line edge thermal head, the larger the scattering of the value of the tension applied to the thermal image transfer recording medium in the direction of the width thereof.

This scattering of the value of the tension is considered to cause not only the scattering of the temperature of the ink to be melted, but also improper image transfer.

Thus, the line edge thermal head has the problems that no ink transfer or uneven ink transfer taken place in normal operation, and Improper ink transfer also takes place at a printing start point when printing speed is changed in a wide range from low speed to high speed.

Furthermore, in the thermal image transfer recording by use of the line edge thermal head 20 as shown in FIG. 1, the heating element portion 201 of the line edge thermal head 20 is in line contact with the thermal image transfer recording medium 30, so that high line pressure is applied to the thermal image transfer recording medium 30 and also to the image recording material 8. Therefore, when the thermal image transfer recording medium 30 and the image recording material 8 are hold between the line edge thermal head 20 and the platen roller 50 and allowed to stand for a long period of time, there is caused a now problem that a thermal image transfer layer of the thermal image transfer recording medium 30 is brought into pressure contact with the image recording material 8 and transferred thereto, causing the smearing of the image recording material 8 with an ink in the transferred thermal image transfer layer.

Since the printer provided with much a line edge thermal head has been recently developed, and the above-mentioned problems have not been noticed until quite recently and countermeasures against such problems have not yet reported.

SUMMARY OF THE INVENTION

It is therefore a first object of the present invention to provide a thermal image transfer recording method free from the problems of improper ink transfer and pressure-contact ink transfer to an image recording material, when a printer provided with a line edge thermal head is employed.

A second object of the present invention is to provide a thermal image transfer recording medium which in free from the problems of improper ink transfer and pressure-contact ink transfer, in particular, free from the problem of pressure-contact ink transfer, when employed in the above-mentioned thermal image transfer recording method by use of a printer provided with a line edge thermal head.

In order to achieve the first object of the present invention, the inventors of the present invention have analyzed the relationship between the tension applied to the thermal image transfer recording medium when the printer is driven and various physical strengths of the thermal image transfer recording medium, and have discovered a thermal image transfer recording method that can achieve the first object of the present invention.

More specifically, the first object of the present invention can be achieved by a thermal image transfer recording method comprising the steps of holding (a) a thermal image transfer recording medium comprising a support material and a thermal image transfer layer provided on the support material and (b) an image recording material, between a line edge thermal head and a platen roller, with a contact pressure applied therebetween; transferring the thermal image transfer recording layer imagewise from the thermal image transfer recording medium to the image recording material with imagewise application of heat thereto by use of the line edge thermal head, with the platen roller being driven in rotation; and taking up the thermal image transfer recording medium after the image transfer, with the take-up tension applied to the thermal image transfer recording medium being set larger than both the shearing strength and peeling strength at 70° C. of the thermal image transfer layer.

When the printer is driven in the above-mentioned manner, not only the improper ink image transfer, but also pressure-contact ink image transfer can be avoided.

In the above thermal image transfer recording method, the take-up tension applied to the thermal image transfer recording medium can be met in the above-mentioned manner prior to the driving of the platen.

Furthermore, the total of the shearing strength and peeling strength of the thermal image transfer recording layer is preferably larger than the close contact adhesion between the thermal image transfer recording layer and the image recording material when the thermal image recording medium and the image recording material are held between the line edge thermal head and the platen roller.

It is preferable that the take-up tension applied to the thermal image transfer recording medium be 40 g/cm or more.

Furthermore, it is preferable that the contact pressure applied between the line edge thermal head and the platen roller be in a range of 50 to 250 g/cm$^2$.

In order to achieve the second object of the present invention, the inventors of the present invention have improved a thermal image transfer recording medium comprising a support material and a thermal image transfer layer formed thereon, and have discovered that when the shearing strength of the image transfer layer is set in a particular range, the second object of the present invention can be achieved.

More specifically, the second object of the present invention can be achieved by a thermal image transfer recording medium comprising a support material and a thermal image transfer layer formed thereon, the thermal image transfer layer having a shearing strength of 200 g/cm or more at 25° C.

In the above thermal image transfer recording medium, it in preferable that the thermal image transfer layer have a shearing strength of 250 g/cm or more at 25° C.

Furthermore, it is preferable that the thermal image transfer layer have a peeling strength of less than 40 g/cm at 70° C.

Further, it is preferable that the thermal image transfer layer have a close contact adhesion of 0.5 g/cm or less at 25° C. with an image recording material having a smoothness of 2400 sec±150 sec.

The above thermal image transfer recording medium may further comprise a release layer between the thermal image transfer layer and the support material, optionally with an adhesive layer being interposed between the support material and the release layer.

The adhesive layer may comprise at least one component selected from the group consisting of polyurethane reasin, ethylene - vinyl acetate copolymer resin, ethylene - ethyl acrylate copolymer resin, and unvulcanized rubber.

The adhesive layer may further comprise at least one component selected from the group consisting of carbon black, an organic filler and an inorganic filler.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

As mentioned previously, the thermal image transfer recording method according to the present invention comprises the steps of holding (a) a thermal image transfer recording medium comprising a support material and a thermal image transfer layer provided on the support material, and (b) an image recording material capable of receiving images from the thermal image transfer layer by thermal image transfer and recording the images thereon, between a line edge thermal head and a platen roller, with a contact pressure applied therebetween; transferring the thermal image transfer layer imagewise from the thermal image transfer recording medium to the image recording material with imagewise application of heat by use of the line edge thermal head, with the platen roller being driven in rotation; and taking up the thermal image transfer recording medium after the image transfer, with the take-up tension applied to the thermal image transfer recording medium being set larger than both the shearing strength and peeling strength at 70° C. of the thermal image transfer layer.

In the above thermal image transfer recording method according to the present invention, by setting the take-up tension applied to the thermal image transfer recording medium larger than both the shearing strength and peeling strength at 70° C. of the thermal image transfer layer, the timing of the transfer of the thermal image transfer layer to the image recording material can be always made constant and non-uniform thermal image transfer can be minimized.

Furthermore, when an ink having high aggregation force is used in the thermal image transfer recording layer, improper image transfer tends to take place because the peeling direction of the thermal image transfer layer is shifted toward the thermal head during the recording process so that the timing of the peeling of the thermal image transfer layer is disturbed.

However, even in the above case, by setting the take-up tension applied to the thermal image transfer recording medium larger as mentioned above, the shifting or scattering of the timing of the transfer of the thermal image transfer layer to the image recording material can be avoided, whereby clear images can be constantly formed on the image recording material.

Figure 3:
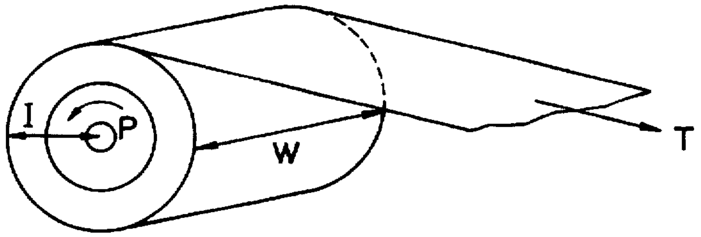
FIG. 3 is a schematic perspective view of a roll of a thermal image transfer recording medium for explanation of the relationship between a take-up tension (T) applied to the recording medium, the radius (I) of the roll, the torque (P) applied to the roll, and the width (W) of the roll.

With reference to FIG. 3 in the present invention, the take-up tension applied to the thermal image transfer recording medium can be determined in accordance with the following formula:

$$T(g/cm)=P(g\cdot cm)/I(cm)\times W(cm)$$

wherein T is the take-up tension (g/cm), P is the torque or twisting moment (g·cm) of a roll of the thermal image transfer recording medium, I is the radius (cm) of the roll of the thermal image transfer recording medium, and W is the width (cm) of the roll of the thermal image transfer recording medium.

Figure 4:
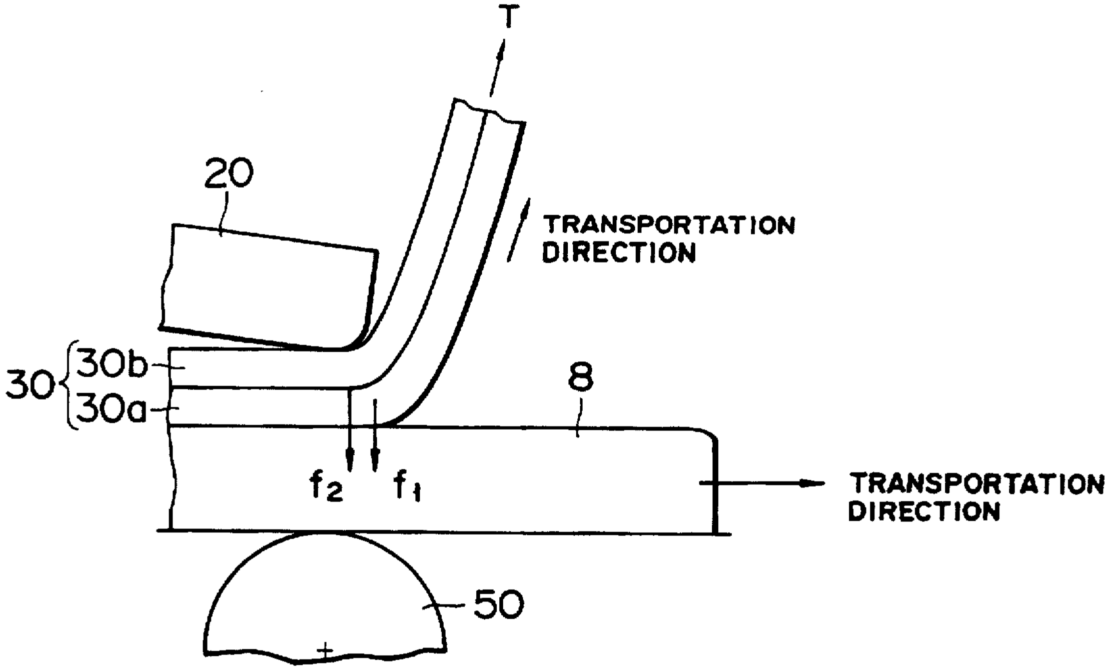
FIG. 4 in a diagram for explanation of the relationship between the take-up tension (T) applied to a thermal image transfer recording medium composed of a thermal image transfer recording layer 30*a* and a support material 30*b*, and the shearing strength $f_1$ and peeling strength $f_2$ of the thermal image transfer recording layer 30*a*.

FIG. 4 shown that, in the case where the take-up tension T is larger than both the shearing strength $f_1$ and peeling strength $f_2$ of the thermal image transfer layer 30*a* provided on a support material 30*b*, that is, $T>f_1$ and $T>f_2$, the thermal image transfer layer 30*a* of the thermal image transfer recording medium 30 is appropriately transferred to the image recording material 8 when the thermal image transfer layer 30*a* is passed over the thermal head 20.

More specifically, when the take-up tension T is larger than the shearing strength $f_1$ of the thermal image transfer layer 30*a*, and also larger than the peeling strength $f_2$ of the thermal image transfer layer 30*a*, the thermal image transfer recording medium 30 is separated from the image recording material 8 when the thermal image transfer recording medium 30 has just passed over the thermal head 20. However, when the take-up tension T is smaller than the shearing strength $f_1$ or the peeling strength $f_2$, the thermal image transfer recording medium 30 is not separated from the image recording material 8 when the thermal image transfer recording medium 30 has paused over the thermal head 20, so that the timing of the separation of the thermal image transfer recording medium 30 from the image recording material 8 is delayed or shifted from a predetermined timing. The result is that it may occur that the separation of the thermal image transfer recording medium 30 from the image recording material 8 takes place when the heated thermal image transfer layer 30*a* is too cooled to be transferred, and the boundaries between the heated areas and non-heated areas became unclear. In such a case, the transfer of the unheated portions of the image transfer layer 30*a* may also take place. As a result, the image quality obtained is significantly lowered.

In the above thermal image transfer recording method, the above-mentioned take-up tension applied to the thermal image transfer recording medium can be set prior to the driving of the platen, in order to prevent improper timing of the separation of the thermal image transfer recording medium 30 from the image recording material 8, since such improper timing may be caused by a delay in the operation of a driving system at the initiation of the printing operation.

Furthermore, the total of the shearing strength $f_1$ and peeling strength $f_2$ of the thermal image transfer layer 30*a* is preferably larger than the close contact adhesion between the thermal image transfer layer 30*a* and the image recording material 8 when the thermal image recording medium and the image recording material 8 are hold between the line edge thermal head 20 and the platen roller 50 in order to prevent the pressure-contact transfer of the thermal image transfer layer 30*a* to the image recording material 8.

It is preferable that the take-up tension applied to the thermal image transfer recording medium be 40 g/cm or more in order to securely perform the above-mentioned operations more effectively, with the prevention of the improper image transfer caused by the change of printing patterns and the variation of the printing speed.

Furthermore, it is preferable that the contact pressure applied between the line edge thermal head and the platen roller be in a range of 50 to 250 g/cm$^2$ in order to secure proper heat transfer from the thermal head 20 to the thermal image transfer recording medium 30 and also to the image recording material 8, thereby preventing the formation of images with voids, also in order to generate the friction between the thermal image transfer recording medium 30 and the image recording material 8 by the contact pressure, thereby preventing the recording material 8 from being transported alone separately from the thermal image transfer recording medium 30.

The thermal image transfer recording medium of the present invention comprises a support material and a thermal image transfer layer formed thereon, the thermal image transfer layer having a shearing strength of 200 g/cm or more at 25° C.

The thermal image transfer recording medium of the present invention is particularly suitable for a thermal image transfer recording method by use of a line edge thermal head and is also capable of preventing improper pressure-contact image transfer when thermal image transfer is not being carried out.

The thermal image transfer recording medium of the present invention can also be used in other thermal image transfer recording methods.

It is preferable that the thermal image transfer recording medium of the present invention be composed of a conventional support material, a release layer formed thereon, which can be easily pealed away from the support material when heated, and a thermal image transfer layer formed on the release layer, which is an ink layer having high aggregation force and can be made softened, but not completely fused, when heated. This is because a thermal image transfer recording medium having such a thermal image transfer layer can be easily set under the conditions that the take-up tension applied to the thermal image transfer recording medium in made larger than each of the shearing strength and peeling strength of the thermal image transfer layer as mentioned previously in accordance with the thermal image transfer recording method of the present invention.

From such a requirement, in the thermal image transfer recording medium of the present invention, the thermal image transfer layer is formed in such a manner that the total of (i) the close contact adhesion between the surface of the thermal image transfer layer and the image recording material and (ii) the shearing force which is applied to the thermal image transfer layer when printing operation is initiated is smaller than the total of the shearing strength and peeling strength of the thermal Image transfer layer. In this case, it is required that the thermal image transfer layer have a shearing strength of 200 g/cm or more at 25° C. It is preferable that the thermal image transfer layer have a shearing strength of 250 g/cm or more at 25° C. in order to prevent the pressure-contact transfer of the image transfer layer to the image recording material effectively when no image transfer operation is carried out.

Figure 5:
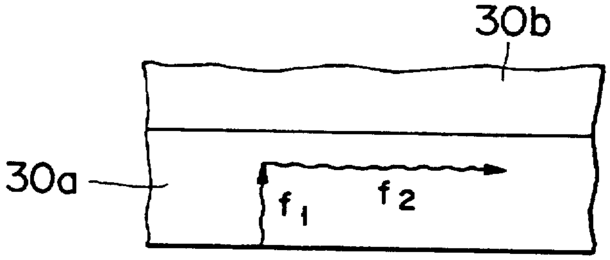
FIG. 5 is a diagram for explanation of the shearing strength $f_1$ of the thermal image transfer layer 30*a* and the peeling strength $f_2$ of the thermal image transfer layer 30*a*.

With reference to FIG. 5, $f_1$ indicates the shearing strength of the thermal image transfer layer 30*a*, which means the force with which the thermal image transfer layer 30*a* in broken in the vertical direction, that is, in the direction of the thickness thereof, and $f_2$ indicates the peeling strength of the thermal image transfer layer 30*a*, which means the force with which the thermal image transfer layer 30*a* is broken in the horizontal direction, that is, in the direction normal to the direction of the thickness thereof after the breaking of the thermal image transfer layer 30*a* in the vertical direction, starting from the portion in which the thermal image transfer layer 30*a* is broken in the vertical direction as mentioned above.

Figure 1:
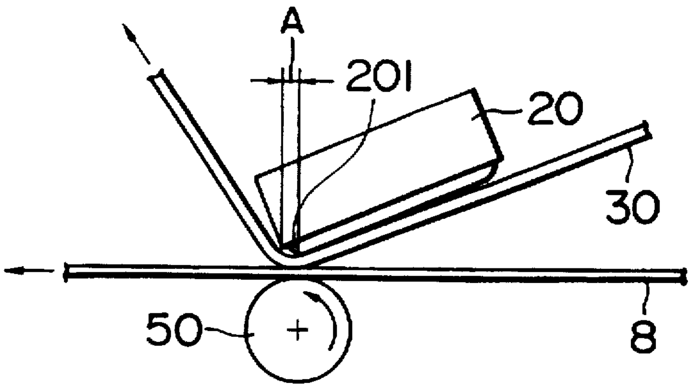
FIG. 1 is a schematic croon-sectional view of a printer incorporated with a line edge thermal head for use in the present invention.
Figure 2:
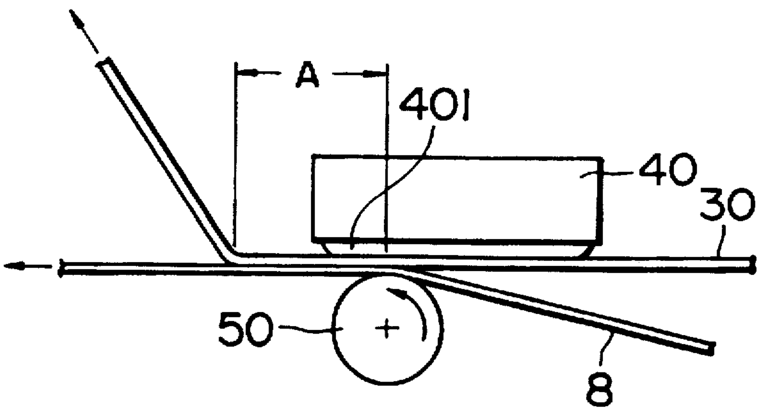
FIG. 2 PRIOR ART
FIG. 2 is a schematic cross-sectional view of a printer incorporated with a conventional line plane thermal head.

As shown in FIG. 2, the line edge thermal head 20 holds the thermal image transfer recording medium 30 under the application thereto of the line pressure of the heating element portion 201 which in situated at the edge portion of the line edge thermal head 20. However, the pressure-contact transfer of the thermal image transfer layer 30*a* to the recording material 8 by this line pressure must be avoided by all means. For this purpose, it in essential that the thermal image transfer layer have a shearing strength of 200 g/cm or more at 25° C. as mentioned previously.

Further, for the same purpose an mentioned above, it in preferable that the thermal image transfer layer have a close contact adhesion of 0.5 g/cm or less at 25° C. with an image recording material having a smoothness of 2400±150 sec, and furthermore, for preventing the pressure-contact thermal transfer of the thermal image transfer layer 30*a* to the recording material 8 and also for high speed printing, it is preferable that the thermal image transfer layer have a peeling strength of less than 40 g/cm at 70° C.

In particular, when the thermal image transfer layer has a peeling strength of less than 40 g/cm at 70° C., the smearing of the thermal head with the thermal image transfer layer can also be prevented, and high speed printing can effectively be achieved.

As mentioned above, in the thermal image transfer recording material of the present invention, it is desirable that the close-contanct adhesion between the thermal image transfer layer 30*a* and the image recording material 8 be small. In order to reduce the close contact adhesion, there can be employed conventional methods such as a method of reducing the contact areas between the thermal image transfer layer 30*a* and the recording material 8 by roughening the surface of the thermal image transfer layer 30*a*, a method of hardening the surface of the thermal image transfer layer 30*a*, and a method of placing a releasing material on any of the contact surfaces of the thermal image transfer layer 30*a* and the recording material 8.

Figure 6:
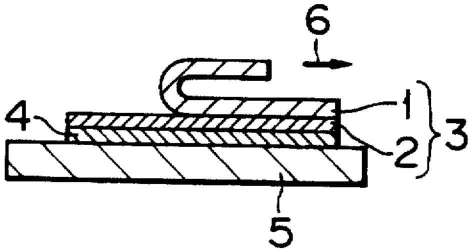
FIG. 6 is a diagram for explanation of a method of measuring the shearing strength and peeling strength of an image transfer layer of a thermal image transfer recording medium for use in the present invention.
Figure 7:
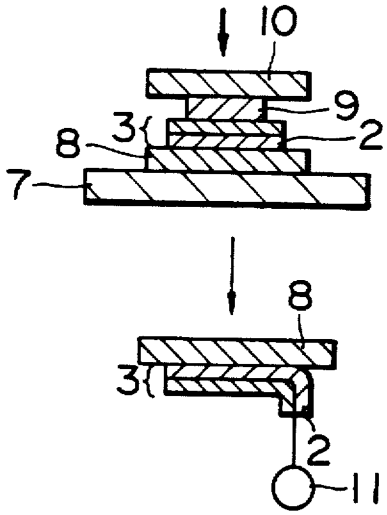
FIG. 7 is a diagram for explanation of a method of measuring the close contact adhesion between the image transfer layer of the thermal image transfer recording medium and an image recording material.

The shearing strength and peeling strength of the image transfer layer 30*a* of the thermal image transfer recording medium 30 and the close contact adhesion between the image transfer layer 30*a* of the thermal image transfer recording medium 30 and the image recording material 8 can be measured by the methods shown in FIG. 6 and FIG. 7.

With reference to FIG. 6, a method of measuring the shearing strength and peeling strength of the image transfer layer of the thermal image transfer recording medium of the present invention will now be explained.

In FIG. 6, it is supposed that a thermal image transfer recording medium 3 of the present invention comprises a support material 1 and a thermal image transfer layer 2 which is formed on the support material 1.

The shearing strength of the thermal image transfer layer 2 of the thermal image transfer recording medium 3 in measured as follower An shown in FIG. 6, the thermal image transfer recording medium 3 is fixed through an adhesive tape 4 onto a constant-temperature plate 5 in such a posture that the thermal image transfer layer 2 of the thermal image transfer recording medium 3 is directed towards the constant-temperature plate 5.

With the temperature of the constant-temperature plate 5 set at a predetermined temperature, for instance, at 25° C. or at 70° C. in the present invention, the support material 1 is peeled away from the thermal image transfer layer 2 in the tension application direction of arrow 6, with a predetermined speed, for instance, at about 30 cm/sec in the present invention, and the tension applied to the thermal image transfer layer 2 at the time of the breaking of the thermal image transfer layer 2 is measured, whereby the shearing strength of the thermal image transfer layer 2 is determined, and the tension applied to the thermal image transfer layer 2 at the time of the peeling of the thermal image transfer layer 2 away from the support material 1 is measured, whereby the peeling strength of the thermal image transfer layer 2 is also determined.

More specifically, the above measurement is carried out by use of a tension gauge. An initial peak obtained by the tension gauge indicates the shearing strength, and the value obtained by the tension gauge during the peeling of the thermal image transfer layer 2 away from the support material 1 indicates the peeling strength.

With reference to FIG. 7, a method of measuring the close contact adhesion between the image transfer layer 2 of the thermal image transfer recording medium 3 and an image recording material 8, for instance, a mirror coat paper with a smoothness of 2400±150 sec in the present invention, will now be explained.

On a support base 7, the image recording material 8 in placed. The thermal image transfer recording medium 3 is then placed on the image recording material 8 in such a manner that the thermal image transfer layer 2 comes into contact with the image recording material 8. A rubber plate 9, for instance, in the present invention, a rubber plate with a size of 2 cm×0.7 cm, is then placed on thermal image transfer recording medium 3 as shown in FIG. 7. A pressure application plate 10, for instance, with a weight of 29 kg in the present invention, is placed on the rubber plate 9, for instance, for 5 minutes in the present invention, to apply pressure to the thermal image transfer recording medium 3.

The pressure application plate 10 in then removed for the elimination of the applied pressure from the thermal image transfer recording medium 3. With a weight 11 attached to the thermal image transfer recording medium 3, the thermal image transfer recording medium 3 is peeled away from the image recording material 8. The weight necessary for the peeling of the thermal image transfer recording medium 3 away from the image recording material 8 is measured, whereby the close contact adhesion between the image transfer layer 2 of the thermal image transfer recording medium 3 and the image recording material 8 is determined.

In order to adjust the above-mentioned shearing strength, peeling strength and close contact adhesion of the thermal image transfer recording medium 3 as desired, it is preferable to provide a release layer consisting essentially of wax on the support material 1, and then to form a thermal image transfer layer with high aggregation force. It is more preferable that an adhesive layer be interposed between the support material 1 and the release layer to bind the support material 1 and the release layer more firmly.

As the material for the support material 1, for instance, conventional films and paper can be employed. More specifically, plastics films with relatively good heat resistance, for example, films of polyester such as polyethylene terephthalate, polycarbonate, triacetyl cellulose, nylon and polyimide; cellophane; and parchment paper are preferable as the material for the support material 1.

In the thermal image transfer recording medium 3 of the present invention, when necessary, a protective layer may be provided on the back side of the support material opposite to the thermal image transfer layer 3.

The protective layer is for protecting the support material 1 from high temperature at the time of heat application thereto by a thermal head during printing operation. As a material for the protective layer, any of a highly heat resistant thermoplastic or thermo-setting resin, a ultraviolet-curing resin, and an electron radiation curing resin can be employed.

Furthermore, examples of a suitable resin for the formation of the protective layer are fluoroplastico, silicone resin, polyimide resin, epoxy resin, phenolic resin and melamine resin. Theme resins can be used in the form of a thin film. By the provision of such a protective layer, the heat resistance of the support material 1 can be significantly improved, so that it becomes possible to use materials which are considered to be unsuitable for the support material 1.

The thermal image transfer layer 2 may be a single ink layer comprising, for example, as the main components a coloring agent, a thermoplastic resin, and a thermofusible material, or composed of a plurality of such ink layers which are overlaid.

As the coloring agent, for instance, carbon black, organic pigments, inorganic pigments, and varieties of dyes can be selectively employed in accordance with the desired color.

There is no particular restriction to the amount of the coloring agent to be employed, but in order to impart friction resistance to the thermal image transfer layer 2, it is preferable that the amount of the coloring agent in the entire weight of the ink layer be in a range of 10 to 50 wt. %; and in order not to reduce the shearing strength of the ink layer excessively, it is preferable that the amount of the coloring agent in the entire weight of the ink layer be in a range of 10 to 20 wt. %

The thermoplastic resin is added to the thermal image transfer layer 2 in order to impart an increased shearing strength and resistance against friction to the thermal image transfer layer 2.

A preferable thermoplastic resin for use in the thermal image transfer layer 2 is such a resin that exhibits adhesion to the recording material 8. Specific examples of such a preferable thermoplastic resin are ethylene - vinyl acetate copolymer, ethylene ethylacrylate copolymer, polyamide, polyester, polyurethane, polyvinyl chloride, varieties of cellulose derivatives, polystyrene, polybutyral, phenolic resin and epoxy resin. In particular, by use of ethylene - vinyl acetate copolymer or ethylene - ethylacrylate copolymer in the thermal image transfer layer 2, image formation on an image recording material with low smoothness and high speed printing can be effectively attained.

The amount of the thermoplastic resin to be added to the thermal image transfer layer 2 varies depending upon the fusing characteristics thereof, but is preferably in a range of 20 to 90 wt. %, more preferably in a range of 40 to 70 wt. %, of the entire weight of the thermal image transfer layer 2.

The thermofusible material is added to the thermal image transfer layer 2 in order to improve the thermal sensitivity. During thermal printing, the thermofusible material in transferred to the image recording material 8, so that it is preferable to use waxes or the like with a melting initiation temperature of 40° C. or more, more preferably with a melting point in a range of 50° to 120° C.

Specific examples of the thermofusible material for use in the thermal image transfer layer 2 are natural waxes such as carnauba wax, candelilia wax, rice wax, been wax, Japan wax, whale wax and montan wax; synthetic waxes such as paraffin wax, microcrystalline wax, oxidized wax and polyethylene wax; higher saturated fatty acids such as margaric acid, lauric acid, myristic acid, palmitic acid and stearic acid; higher saturated alcohols such as stearyl alcohol and behenyl alcohol; higher esters such as sorbitan fatty acid ester; and higher fatty acid amides such an stearic amide and oleic amido.

Of these thermofusible materials, carnauba wax and candelilla wax, with a low penetration of a loaded needle thereinto, are most preferable in order to enhance the resistance of images against the friction thereof.

The amount of the thermofusible material to be added to the thermal image transfer layer 2 can be varied as desired in accordance with the amount of the above-mentioned thermoplastic resin. However, it is preferable that the amount of the thermofusible material be in a range of 10 to 60 wt. %, more preferably in a range of 20 to 50 wt. %, of the entire weight of the thermal image transfer layer 2.

In order to make the surface of the thermal image transfer layer 2 rough, a filler made of polyethylene, silica, alumina or calcium carbonate can be added to the thermal image transfer layer 2. When such a filler is added to the thermal image transfer layer 2, it is necessary to appropriately adjust the amount of the filler to be added to the thermal image transfer layer 2 because the adhesion of the thermal image transfer layer 2 to the support material 1 and the shearing strength of the thermal image transfer layer 2 tend to be decreased by the addition of the filler thereto.

It is preferable that such a filler be added to the thermal image transfer layer 2 in an amount of 10 wt. % or lose of the entire weight of the thermal image transfer layer 2.

The release layer in provided in order to improve the releasability of the thermal image transfer layer 2 from the support material 1 during thermal printing. Therefore, it is preferable that the release layer be constructed in such a manner that the release layer is melted and becomes a liquid with low viscosity during thermal printing by use of a thermal head and the release layer can be easily cut near the interface of a heated are and a non-heated area of the release layer. Therefore it is preferable that the release layer comprise as the main component a wax-like material which is hard at room temperature and melted when heated.

Specific examples of such a wax-like material for use in the release layer are natural waxes such as bees wax, carnauba wax, whale wax, Japan wax, candelilla wax, rice wax and montan wax; synthetic waxes such as paraffin wax, microcrystalline wax, oxidized wax, osocerite, cereain, ester wax and polyethylene wax; higher saturated fatty acids such an margaric acid, lauric acid, myristic acid, palmitic acid, stearic acid, phloionic acid and behenic acid; higher alcohols such as stearyl alcohol and behenyl alcohol; higher saturated stars such as sorbitan fatty acid ester; and higher fatty acid amides such as stearic amide and oleic amide.

In addition to the above-mentioned wax-like materials, any of the following materials may be added to the release layer in order to impart flexibility to the release layer and to increase the adhesiveness of the release layer to the support material 1; unvulcanized rubbers such as isoprene rubber, butadiene rubber, ethylene propylene rubber, butyl rubber and nitrile rubber; polyolefin resins such as ethylene - vinyl acetate copolymer or ethylene - ethylacrylate copolymer; polyamide resin; polyurethane resin; polyester resin; polyacryl resin; cellulose resin; polyvinyl alcohol resin; petroleum resin; phenolic resin; and polystyrene resin. These materials may be used in combination.

It is preferable that the above-mentioned wax-like material be added to the release layer in an amount of 50 to 100 wt. %, more preferably in an amount of 80 to 100 wt. %, of the entire weight of the release layer.

The shearing strength and peeling strength of the image transfer layer 2 and the adhesion of the image transfer layer 2 to the support material 1 vary depending upon the conditions for drying the image transfer layer and the above-mentioned release layer, so that it is necessary to appropriately adjust the drying conditions in order to obtain an image transfer layer 2 with the desired properties In order to increase the shearing strength of the image transfer layer 2 when thermal printing is not being conducted, it in preferable to interpose an adhesive layer between the support material 1 and the release layer.

The main component for the adhesive layer in such a material that can firmly bond the support material 1 and the wax-like material which in the main component for the release layer when thermal printing is not performed, but does not have any adverse effect on the peeling strength of the thermal image transfer layer 2 during quick-peel-off image transfer.

Specific examples of such a main component for the adhesive layer are unvulcanized rubbers such as isoprene rubber, butadiene rubber, ethylene propylene rubber, butyl rubber and nitrile rubber; polyolefin resins such as ethylene - vinyl acetate copolymer and ethylene ethylacrylate copolymer; polyurethane resin; polyacryl resin; cellulose resin; phenolic resin; and petroleum resin. These materials may be crosslinked by use of an appropriate cross-linking agent in order to prevent these materials from being mixed with the components of the release layer.

In order to increase the adhesion interface between the adhesive layer and the release layer, it is preferable to make the surface of the adhesive layer rough. This can be carried out by the addition of carbon black, graphite, an inorganic filler such as calcium carbonate or titanium oxide, or an organic filler such as polyvinyl chloride powder.

By the provision of the above-mentioned release layer and adhesive layer, the pressure-contact transfer of the thermal image transfer layer to the image recording material can be avoided, and high speed printing can be carried out effectively. In particular, the above-mentioned resins and rubber are particularly useful for the adhesive layer.

Furthermore, by use of the above-mentioned carbon black and fillers, when used in the form of particles, in the adhesive layer, the pressure-contact transfer of the image transfer layer to the image recording material can also be effectively prevented.

The above explained thermal image transfer layer can be provided on the support material by various coating methods such as a hot-melt coating method, an aqueous coating method, and an organic-solvent coating method.

It is preferable that the entire thickness of the thermal image transfer layer be in a range of 0.1 to 10 μm, more preferably in a range of 0.5 to 6.0 μm. When the thermal image transfer layer is composed of a plurality of overlaid ink layers, it is preferable that each ink layer have a thickness in a range of 0.5 to 6.0 μm, more preferably in a range of 0.8 to 3.0 μm.

Furthermore, it is preferable that the release layer have a thickness of 0.2 to 3.0 μm, more preferably a thickness of 1.0 to 2.0 μm; and that the adhesive layer have a thickness of 0.05 to 2.0 μm, more preferably a thickness of 0.1 to 0.5 μm.

Other features of this invention will become apparent in the course of the following description of exemplary embodiments, which are given for illustration of the invention and are not intended to be limiting thereof.

[Preparation of Test Samples of Thermal Image Transfer Recording Media]

Sample 1

[Formation of Release Layer]

A mixture of the following components was dissolved in toluene, whereby a coating liquid for the formation of a release layer was prepared:

| | Parts by Weight |
|---|---|
| Wax: Carnauba wax | 95 |
| ThermoPlastic resin: | 5 |
| Polyester resin (Tg: 36° C., Melt viscosity 1500–2000, Flow tester (made by Shimadzu Corporation) 190° C., 30 kg/cm$^2$) | |

The thus prepared coating liquid for the formation of a release layer was coated on a polyester film with a width of 10 cm and a thickness of 4.5 μm serving as a support material and dried at 40° C., whereby a release layer with a thickness of 1.5 μm was formed on the polyester film.

[Formation of Image Transfer Layer]

A mixture of the following components was dispersed in toluene, whereby a coating liquid for the formation of an image transfer layer was prepared:

| | Parts by Weight |
|---|---|
| Coloring Agent: Carbon black | 20 |
| Thermoplastic Resin: Ethylene - vinyl acetate copolymer (MI: 15 dg/min) | 40 |

-continued

| | Parts by Weight |
|---|---|
| Wax: Carnauba wax | 35 |
| Filler: Polyvinyl chloride powder | 5 |

The thus prepared coating liquid for the formation of an image transfer layer was coated on the above formed release layer and dried at 40° C., whereby an image transfer layer with a thickness of 1.5 μm was formed on the release layer. Thus, a thermal image transfer recording medium test sample No. 1 was fabricated.

The shearing strength, peeling strength and adhesion of the image transfer layer of the thermal image transfer recording medium test sample No. 1 were measured by the previously mentioned method. The results were as follows:

Shearing strength at 25° C.: 220 g/cm
Shearing strength at 70° C.: 36 g/cm
Peeling strength at 25° C.: 255 g/cm
Peeling strength at 70° C.: 35 g/cm
Adhesion at 25° C.: 0.37 g/cm Sample 2

[Formation of Adhesive Layer]

100 parts by weight of polyester resin (Tg=15° C., Mw=25,000–30,000) were dissolved in toluene, whereby a coating liquid for the formation of an adhesive layer was prepared.

The thus prepared coating liquid for the formation of an adhesive layer was coated on a polyester film with a width of 10 cm and a thickness of 4.5 μm and dried at 80° C., whereby an adhesive layer with a thickness of 0.2 μm was formed on the polyester film.

[Formation of Release Layer]

A mixture of the following components was dissolved in toluene, whereby a coating liquid for the formation of a release layer was prepared:

| | Parts by Weight |
|---|---|
| Wax: Carnauba wax | 95 |
| Thermoplastic resin: Polyester resin (Tg: 36° C., Melt viscosity 1500–2000, Flow tester (made by Shimadzu Corporation) 190° C., 30 kg/cm$^2$) | 5 |

The thus prepared coating liquid for the formation of a release layer was coated on the above formed adhesive layer and dried at 80° C., whereby a release layer with a thickness of 1.5 μm was formed on the adhesive layer.

[Formation of Image Transfer Layer]

A mixture of the following components was dispersed in toluene, whereby a coating liquid for the formation of an image transfer layer was prepared:

| | Parts by Weight |
|---|---|
| Coloring Agent: Carbon black | 20 |
| Thermoplastic Resin: Ethylene - vinyl acetate copolymer (MI: 15 dg/min) | 50 |
| Wax: Carnauba wax | 35 |
| Filler: Polyvinyl chloride powder | 5 |

The thus prepared coating liquid for the formation of an image transfer layer was coated on the above formed release layer and dried at 35° C., whereby an image transfer layer with a thickness of 1.5 μm was formed on the release layer. Thus, a thermal image transfer recording medium test sample No. 2 was fabricated.

The shearing strength, peeling strength and adhesion of the image transfer layer of the thermal image transfer recording medium test sample No. 2 were measured by the previously mentioned methods. The results were as follows:

Shearing strength at 25° C.: 220 g/cm
Shearing strength at 70° C.: 37 g/cm
Peeling strength at 25° C.: 280 g/cm
Peeling strength at 70° C.: 35 g/cm
Adhesion at 25° C.: 0.37 g/cm Sample 3

[Formation of Adhesive Layer]

100 parts by weight of ethylene - vinyl acetate copolymer (Melt flow rates 2.5 dg/cm$^2$ (JIS K 6730), Content of vinyl acetate: 46 wt. %) were dissolved in toluene, whereby a coating liquid for the formation of an adhesive layer was prepared.

The thus prepared coating liquid for the formation of an adhesive layer was coated on a polyester film with a width of 10 cm and a thickness of 4.5 μm and dried at 80° C., whereby an adhesive layer with a thickness of 0.2 μm was formed on the polyester film.

[Formation of Release Layer]

A mixture of the following components was dissolved in toluene, whereby a coating liquid for the formation of a release layer was prepared:

| | Parts by Weight |
|---|---|
| Wax: Carnauba wax | 95 |
| Thermoplastic resin: Polyester resin (Tg: 36° C., Melt viscosity 1500–2000, Flow tester (made by Shimadzu Corporation) 190° C., 30 kg/cm$^2$) | 5 |

The thus prepared coating liquid for the formation of a release layer was coated on the above formed adhesive layer and dried at 35° C., whereby a release layer with a thickness of 1.5 μm was formed on the adhesive layer.

[Formation of Image Transfer Layer]

A mixture of the following components was dispersed in toluene, whereby a coating liquid for the formation of an image transfer layer was prepared:

| | Parts by Weight |
|---|---|
| Coloring Agent: Carbon black | 20 |
| Thermoplastic Resin: Ethylene - vinyl acetate copolymer (MI: 15 dg/min) | 50 |
| Wax: Carnauba wax | 35 |
| Filler: Polyvinyl chloride powder | 5 |

The thus prepared coating liquid for the formation of an image transfer layer was coated on the above formed release layer and dried at 40° C., whereby an image transfer layer with a thickness of 1.5 μm was formed on the release layer. Thus, a thermal image transfer recording medium test sample No. 3 was fabricated.

The shearing strength, peeling strength and adhesion of the image transfer layer of the thermal image transfer recording medium test sample No. 3 were measured by the previously mentioned methods. The results were as follows:

Shearing strength at 25° C.: 220 g/cm
Shearing strength at 70° C.: 40 g/cm
Peeling strength at 25° C.: 290 g/cm
Peeling strength at 70° C.: 38 g/cm
Adhesion at 25° C.: 0.37 g/cm Sample 4

[Formation of Adhesive Layer]

100 parts by weight of nitrile rubber (acrylonitrile - butadiene copolymer, Mw=280,000) were dissolved in toluene, whereby a coating liquid for the formation of an adhesive layer was prepared.

The thus prepared coating liquid for the formation of an adhesive layer was coated on a polyester film with a width of 10 cm and a thickness of 4.5 μm and dried at 80° C., whereby an adhesive layer with a thickness of 0.2 μm was formed on the polyester film.

[Formation of Release Layer]

A mixture of the following components was dissolved in toluene, whereby a coating liquid for the formation of a release layer was prepared:

| | Parts by Weight |
|---|---|
| Wax: Carnauba wax | 95 |
| Thermoplastic resin: Polyester resin (Tg: 36° C., Melt viscosity 1500–2000, Flow tester (made by Shimadzu Corporation) 190° C., 30 kg/cm$^2$) | 5 |

The thus prepared coating liquid for the formation of a release layer was coated on the above formed adhesive layer and dried at 35° C., whereby a release layer with a thickness of 1.5 μm was formed on the adhesive layer.

[Formation of Image Transfer Layer]

A mixture of the following components was dispersed in toluene, whereby a coating liquid for the formation of an image transfer layer was prepared:

| | Parts by Weight |
|---|---|
| Coloring Agent: Carbon black | 20 |
| Thermoplastic Resin: Ethylene - vinyl acetate copolymer (MI: 15 dg/min) | 50 |
| Wax: Carnauba wax | 35 |
| Filler: Polyvinyl chloride powder | 5 |

The thus prepared coating liquid for the formation an image transfer layer was coated on the above formed release layer and dried at 40° C., whereby an image transfer layer with a thickness of 1.5 μm was formed on the release layer. Thus, a thermal image transfer recording medium test sample No. 4 was fabricated.

The shearing strength, peeling strength and adhesion of the image transfer layer of the thermal image transfer recording medium test sample No. 4 were measured by the previously mentioned methods. The results were as follows:

Shearing strength at 25° C.: 220 g/cm
Shearing strength at 70° C.: 39 g/cm
Peeling strength at 25° C.: 290 g/cm
Peeling strength at 70° C.: 38 g/cm
Adhesion at 25° C.: 0.37 g/cm Sample 5

[Formation of Adhesive Layer]

80 parts by weight of ethylene - vinyl acetate copolymer (Malt flow rates 2.5 dg/cm$^2$ (JIS K6730), content of vinyl acetate: 46%) and 20 parts by weight of carbon black were dispersed in toluene, whereby a coating liquid for the formation of an adhesive layer was prepared.

The thus prepared coating liquid for the formation of an adhesive layer was coated on a polyester film with a width of 10 cm and a thickness of 4.5 μm and dried at 80° C., whereby an adhesive layer with a thickness of 0.2 μm was formed on the polyester film.

[Formation of Release Layer]

A mixture of the following components was dissolved in toluene, whereby a coating liquid for the formation of a release layer was prepared:

| | Parts by Weight |
|---|---|
| Wax: Carnauba wax | 95 |
| Thermoplastic resin: Polyester resin (Tg: 36° C., Melt viscosity 1500–2000, Flow tester (made by Shimadzu Corporation) 190° C., 30 kg/cm$^2$) | 5 |

The thus prepared coating liquid for the formation of a release layer was coated on the above formed adhesive layer and dried at 35° C., whereby a release layer with a thickness of 1.5 μm was formed on the adhesive layer.

[Formation of Image Transfer Layer]

A mixture of the following components was dispersed in toluene, whereby a coating liquid for the formation of an image transfer layer was prepared:

| | Parts by Weight |
|---|---|
| Coloring Agent: Carbon black | 20 |
| Thermoplastic Resin: Ethylene - vinyl acetate copolymer (MI: 15 dg/min) | 50 |
| Wax: Carnauba wax | 35 |
| Filler: Polyvinyl chloride powder | 5 |

The thus prepared coating liquid for the formation of an image transfer layer was coated on the above formed release layer and dried at 40° C., whereby an image transfer layer with a thickness of 1.5 μm was formed on the release layer. Thus, a thermal image transfer recording medium test sample No. 5 was fabricated.

The shearing strength, peeling strength and adhesion of the image transfer layer of the thermal image transfer recording medium test sample No. 5 were measured by the previously mentioned methods. The results were as follows:

Shearing strength at 25° C.: 220 g/cm
Shearing strength at 70° C.: 39 g/cm
Peeling strength at 25° C.: 320 g/cm
Peeling strength at 70° C.: 37 g/cm
Adhesion at 25° C. 0.37 g/cm Sample 6

[Formation of Adhesive Layer]

80 parts by weight of ethylene - vinyl acetate copolymer (Melt flow rates 2.5 dg/cm$^2$ (JIS X6730), content of vinyl acetates 46%) and 20 parts by weight of polyvinyl chloride powder were dispersed in toluene, whereby a coating liquid for the formation of an adhesive layer was prepared.

The thus prepared coating liquid for the formation of an adhesive layer was coated on a polyester film with a width of 10 cm and a thickness of 4.5 μm and dried at 80° C., whereby an adhesive layer with a thickness of 0.2 μm was formed on the polyester film.

[Formation of Release Layer]

A mixture of the following components was dissolved in toluene, whereby a coating liquid for the formation of a release layer was prepared:

| | Parts by Weight |
|---|---|
| Wax: Carnauba wax | 95 |
| Thermoplastic resin: | 5 |
| Polyester resin (Tg: 36° C., | |
| Melt viscosity 1500–2000, | |
| Flow tester (made by Shimadzu | |
| Corporation) 190° C., 30 kg/cm$^2$) | |

The thus prepared coating liquid for the formation of a release layer was coated on the above formed adhesive layer and dried at 35° C., whereby a release layer with a thickness of 1.5 μm was formed on the adhesive layer.

[Formation of Image Transfer Layer]

A mixture of the following components was dispersed in toluene, whereby a coating liquid for the formation of an image transfer layer was prepared:

| | Parts by Weight |
|---|---|
| Coloring Agent: | 20 |
| Carbon black | |
| Thermoplastic Resin: | 50 |
| Ethylene - vinyl acetate | |
| copolymer (MI: 15 dg/min) | |
| .Wax: Carnauba wax | 35 |
| Filler: Polyvinyl | 5 |
| chloride powder | |

The thus prepared coating liquid for the formation of an image transfer layer was coated on the above formed release layer and dried at 40° C., whereby an image transfer layer with a thickness of 1.5 μm was formed on the release layer. Thus, a thermal image transfer recording medium test sample No. 6 was fabricated.

The shearing strength, peeling strength and adhesion of the image transfer layer of the thermal image transfer recording medium test sample No. 6 were measured by the previously mentioned methods. The results were as follows:

Shearing strength at 25° C: 220 g/cm

Shearing strength at 70° C.: 40 g/cm

Peeling strength at 25° C.: 315 g/cm

Peeling strength at 70° C.: 38 g/cm

Adhesion at 25° C.: 0.37 g/cm

Sample 7

[Formation of Release Layer]

A mixture of the following components was dissolved in toluene, whereby a coating liquid for the formation of a release layer was prepared:

| | Parts by Weight |
|---|---|
| Wax: Carnauba wax | 70 |
| Thermoplastic resin: | 30 |
| Ethylene - vinyl acetate | |
| copolymer (MI: 15 dg/min, | |
| Content of vinyl acetate: | |
| 28 wt. %) | |

The thus prepared coating liquid for the formation of a release layer was coated on a polyester film with a width of 10 cm and a thickness of 4.5 μm and dried at 40° C., whereby a release layer with a thickness of 1.5 μm was formed on the polyester film.

[Formation of Image Transfer Layer]

A mixture of the following components was dispersed in toluene, whereby a coating liquid for the formation of an image transfer layer was prepared:

| | Parts by Weight |
|---|---|
| Coloring Agent: | 20 |
| Carbon black | |
| Thermoplastic Resin: | 10 |
| Ethylene - vinyl acetate | |
| copolymer (MI: 15 dg/min, | |
| Content of vinyl acetate: 28 wt. %) | |
| Wax: Carnauba wax | 70 |

The thus prepared coating liquid for the formation of an image transfer layer was coated on the above formed release layer and dried at 40° C., whereby an image transfer layer with a thickness of 1.5 μm was formed on the release layer. Thus, a thermal image transfer recording medium test sample No. 7 was fabricated.

The shearing strength, peeling strength and adhesion of the image transfer layer of the thermal image transfer recording medium test sample No. 7 were measured by the previously mentioned methods. The results were as follows:

Shearing strength at 25° C.: 120 g/cm

Shearing strength at 70° C.: 76 g/cm

Peeling strength at 25° C.: 85 g/cm

Peeling strength at 70° C.: 75 g/cm

Adhesion at 25° C.; 0.54 g/cm

Sample 8

[Formation of Release Layer]

A mixture of the following components was dissolved in toluene, whereby a coating liquid for the formation of a release layer was prepared:

| | Parts by Weight |
|---|---|
| Carnauba wax | 55 |
| Candelilla | 20 |
| Polybutadiene rubber (Trademark | 15 |
| "JSR BR 31" made by Japan Synthetic | |
| Rubber Co., Ltd.) | |
| Styrene - butadiene rubber | 10 |
| (Trademark "JSR 1712" made by | |
| Japan Synthetic Rubber Co., Ltd.) | |

The thus prepared coating liquid for the formation of a release layer was coated on a polyester film with a width of 10 cm and a thickness of 4.5 μm and dried at 40° C., whereby a release layer with a thickness of 1.5 μm was formed on the polyester film.

[Formation of Image Transfer Layer]

A mixture of the following components was dispersed in toluene, whereby a coating liquid for the formation of an image transfer layer was prepared:

| | Parts by Weight |
|---|---|
| Coloring Agent: | 15 |
| Carbon black | |
| Thermoplastic Resin: | 15 |
| Ethylene - vinyl acetate | |
| copolymer (MI: 15 dg/min, | |
| Content of vinyl acetate: 28 wt. %) | |
| Carnauba wax | 73 |

-continued

| | Parts by Weight |
|---|---|
| Polybutadiene rubber (Trademark "JSR BR 31" made by Japan Synthetic Rubber Co., Ltd.) | 2 |

The thus prepared coating liquid for the formation of an image transfer layer was coated on the above formed release layer and dried at 40° C., whereby an image transfer layer with a thickness of 1.5 μm was formed on the release layer. Thus, a thermal image transfer recording medium test sample No. 8 was fabricated.

The shearing strength, peeling strength and adhesion of the image transfer layer of the thermal image transfer recording medium test sample No. 8 were measured by the previously mentioned methods. The results were as follows:

Shearing strength at 25° C.: 100 g/cm
Shearing strength at 70° C.: 70 g/cm
Peeling strength at 25° C.: 5 g/cm
Peeling strength at 70° C.: 20 g/cm
Adhesion at 25° C.: 0.56 g/cm The thus prepared thermal image transfer recording medium test sample No. 8 is a conventional thermal image transfer recording medium for use with a serial printer with a plane thermal head.

The thus produced thermal image transfer recording medium test samples Nos. 1 to 8 were subjected to evaluation tests by use of a printing test machine in which a 13-cm long line edge thermal head with a printing space distance A of 210 μm made by Rhom Co., Ltd. and a platen roller were incorporated, in order to evaluate (1) the image transfer performance of each thermal image transfer recording medium test sample and (2) the degree of smearing of an image recording material while in pressure contact with each thermal image transfer recording medium test sample, that is, the degree of the pressure-contact transfer of the thermal image transfer layer of the thermal image transfer recording medium test sample to the image recording material.

Each of the above thermal image transfer recording medium test samples was made in the form of a ribbon roll with a width of 10 cm and a roll radius of 1.4 cm for the evaluation tests.

The take-up tension applied to each of the thermal image transfer recording medium test sample in the form of the ribbon roll was changed to 32 g/cm (with a torque of 448 g·cm), 43 g/cm (with a torque of 602 g·cm), and 78 g/cm (with a torque of 1092 g·cm).

As the image transfer recording medium, a commercially available mirror coat paper with a Bekk's smoothness of 2400 seconds was employed. The thermal printing was conducted at a speed of 254 mm/sec.

Under the above-mentioned conditions, the image transfer performance of each thermal image transfer recording medium test sample was measured by continuously conducting the thermal printing on 500 sheets of the mirror coat paper and the ratio of the occurrence of improper image transfer was measured.

The degree of smearing of the mirror coat paper while in pressure contact with each thermal image transfer recording medium test sample at a contact pressure of 200 g/cm$^2$ applied between the line edge thermal head and the platen roller was visually inspected by holding each thermal image transfer recording medium test sample in pressure contact with the mirror coat paper in the printing test machine.

The results were as shown in the following TABLE 1:

TABLE 1

| | Properties | | | Take-up Tension (g/cm) | | | | | |
|---|---|---|---|---|---|---|---|---|---|
| | Shearing Strength at 25° C. | Shearing Strength at 70° C. | Peeling Strength at 70° C. | 32 g/cm | | 43 g/cm | | 78 g/cm | |
| | | | | T | S | T | S | T | S |
| Test Sample No. 1 | 220 g/cm | 38 g/cm | 35 g/cm | X | Δ | ◎ | Δ | ○ | Δ |
| Test Sample No. 2 | 220 g/cm | 37 g/cm | 35 g/cm | X | ○ | ◎ | ○ | ○ | ○ |
| Test Sample No. 3 | 220 g/cm | 40 g/cm | 38 g/cm | X | ○ | ◎ | ○ | ○ | ○ |
| Test Sample No. 4 | 220 g/cm | 39 g/cm | 38 g/cm | X | ○ | ◎ | ○ | ○ | ○ |
| Test Sample No. 5 | 220 g/cm | 39 g/cm | 37 g/cm | X | ◎ | ◎ | ◎ | ○ | ◎ |
| Test Sample No. 6 | 220 g/cm | 40 g/cm | 38 g/cm | X | ◎ | ◎ | ◎ | ○ | ◎ |
| Test Sample No. 7 | 120 g/cm | 76 g/cm | 75 g/cm | X | X | X | X | ○ | X |
| Test Sample No. 8 | 100 g/cm | 70 g/cm | 20 g/cm | X | X | X | X | ○ | X |

Note:
"T" denotes the image transfer performance, and
"S" denotes the degree of smearing of the mirror coat paper while in pressure contact with the thermal image transfer recording medium test sample at a contact pressure of 200 g/cm$^2$.

In the evaluation of the image transfer performance in the above TABLE 1, symbol "◎" denotes that the occurrence of the improper image transfer was 0%; symbol "○" denotes that the occurrence of improper image transfer was 1 to 10%; symbol "Δ" denotes that the occurrence of improper image transfer was 11 to 30%; symbol "x" denotes that the occurrence of improper image transfer was more than 30%.

In the evaluation of the degree of smearing of the mirror coat paper while in pressure contact with each thermal image transfer recording medium test sample in the above TABLE 1, symbol "◎" denotes that there was no smearing in the mirror coat paper even after 3-minute pressure contact with the thermal image transfer recording medium test sample; symbol "○" denotes that there was no smearing in the mirror coat paper after 1-minute pressure contact with the thermal image transfer recording medium test sample, but there was smearing therein after 3-minute pressure contact, but the smearing was not noticeable; symbol "Δ" denotes that there was slight smearing in the mirror coat paper after 1-minute pressure contact with the thermal image transfer recording medium test sample; symbol "x" denotes that there was conspicuous smearing in the mirror coat paper after 1-minute pressure contact with the thermal image transfer recording medium test sample.

The results in the above TABLE 1 indicate that when the take-up tension applied to the thermal image transfer recording medium is set larger than both (i) the shearing strength and (ii) peeling strength at 70° C. of the thermal image transfer layer, excellent image transfer performance can be obtained. Furthermore, thermal image transfer recording media comprising a thermal image transfer layer with a shearing strength of 200 g/cm or more at 25° C. substantially do not smear the mirror coat paper with the ink even while in pressure contact therewith.

Japanese Patent Applications Nos. 6-225677 filed Aug. 26, 1994 and 6-329935 filed Dec. 5, 1994 are hereby incorporated by reference.

What is claimed is:

1. A thermal image transfer recording method comprising the steps of:

(1) holding (a) a thermal image transfer recording medium comprising a support material and a thermal image transfer layer having a shearing and a peeling strength at 70° C., provided on said support material, and (b) an image recording material between a line edge thermal head and a platen roller, with a contact pressure being applied therebetween to form a close contact adhesion;

(2) driving said platen roller and transferring said thermal image transfer recording layer imagewise from said thermal image transfer recording medium to said image recording material with imagewise application of heat by use of said line edge thermal head; and (3) applying tension so as to take-up said thermal image transfer recording medium after said image transfer, wherein the take-up tension applied to said thermal image transfer recording medium is larger than both the shearing strength and peeling strength of said thermal image transfer layer as measured at 70° C.

2. The thermal image transfer recording method as claimed in claim 1, further comprising applying said contact pressure of step (1) such that the total of the shearing strength and peeling strength of said thermal image transfer recording layer is larger than said close contact adhesion between said thermal image transfer recording layer and said image recording material formed in step (1).

3. The thermal image transfer recording method as claimed in claim 1, wherein the take-up tension applied to said thermal image transfer recording medium in step (3) is 40 g/cm or more.

4. The thermal image transfer recording method as claimed in claim 1, wherein said contact pressure applied between said line edge thermal head and said platen roller in step (1) is in a range of 50 to 250 $g/cm^2$.

* * * * *